United States Patent [19]

Alm

[11] 4,299,265
[45] Nov. 10, 1981

[54] RESTRAINING WHEEL MEANS

[75] Inventor: Bernard D. Alm, Willowdale, Canada

[73] Assignee: FMC Corporation, San Jose, Calif.

[21] Appl. No.: 135,232

[22] Filed: Mar. 31, 1980

Related U.S. Application Data

[63] Continuation of Ser. No. 871,891, Jan. 23, 1978, abandoned.

[30] Foreign Application Priority Data

Dec. 6, 1977 [CA] Canada .................................. 292501

[51] Int. Cl.³ .............................................. B60C 25/12
[52] U.S. Cl. ........................................ 157/1.1; 157/15
[58] Field of Search ...................... 425/17, 49, 52, 53, 425/54, 58; 157/1, 1.1, 14, 15, 21, 1.24

[56] References Cited

U.S. PATENT DOCUMENTS

| | | | |
|---|---|---|---|
| 2,233,371 | 2/1941 | Smith | 157/21 X |
| 3,036,625 | 5/1962 | Penkoff et al. | 157/14 X |
| 3,648,746 | 3/1972 | Beaman | 157/14 |
| 3,774,664 | 11/1973 | Matysak | 157/1.1 |
| 3,780,785 | 12/1973 | Schulhz et al. | 157/1.24 |
| 3,783,928 | 1/1974 | Lee | 157/1.1 |

FOREIGN PATENT DOCUMENTS 484894 9/1953 Italy ..................................... 157/14

Primary Examiner—W. D. Bray
Attorney, Agent, or Firm—H. M. Stanley

[57] ABSTRACT

A wheel restraining means having an upper rigid plate and a compressible air bag or similar flexible medium where a generally annular configuration is provided. This structure is mounted on a shaft and a conical member secures the structure to the shaft. The lower compressible surface engages a wheel rim which is mounted on the shaft. The pressurable engagement between the undersurface of the wheel restraining means and the adjacent surfaces of the wheel rim serve to secure the wheel on the shaft.

4 Claims, 4 Drawing Figures

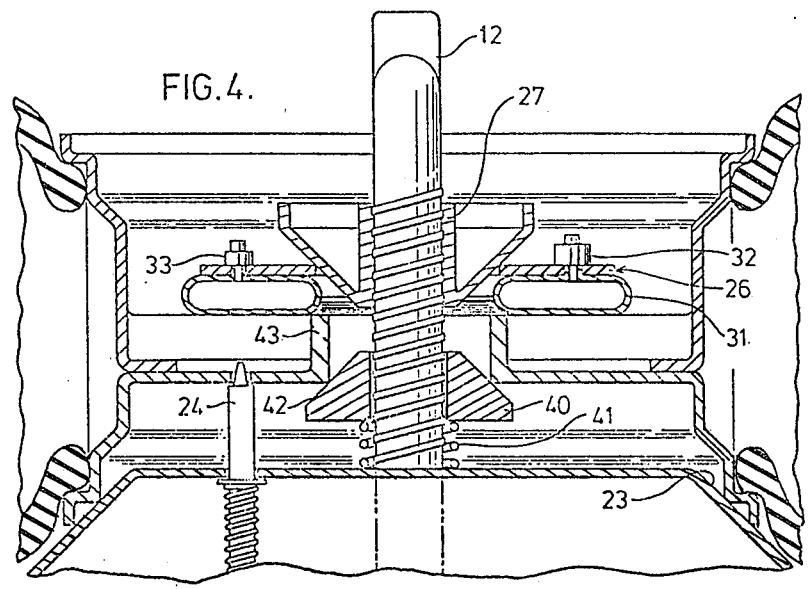
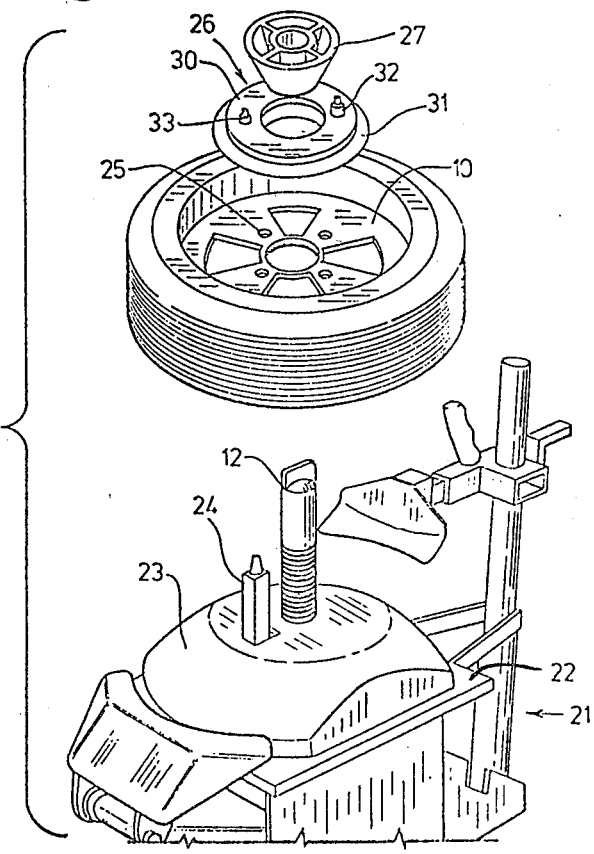

RESTRAINING WHEEL MEANS

This is a continuation of application Ser. No. 871,891 filed Jan. 23, 1978, and now abandoned.

This invention relates to means for securing tires on shafts so that they may be repaired or adjusted and particularly to structures known as adapters for securing tire wheels onto tire-changing machines or wheel-balancing machines.

BACKGROUND OF THE INVENTION

Wheel structures, at least in North American model wheels, normally comprise a central hub opening surrounded by a regular arrangement of spaced-apart bolt holes for securement to the axle. Such wheel structures are still the most common.

However, with the advent of magnesium wheels and other more exotic or sophisticated forms of wheels, the structure of wheels has led to the provision of radial reinforcing ribs and the provision of a great variety of bolt hole configurations.

The accommodation and restraining of these latter types of wheels on conventional tire-changing machines has been awkward and time-consuming.

The conventional tire-changing machine has a central post which passes through the central hub hole of the wheel and a second, hinged, pointed shaft which engages a selected one of the bolt holes on the wheel web. A threaded collar mounted on the central post completes the wheel securement.

With the "exotic" wheel forms the securement cannot be effected as with the more common wheel.

At present these "exotic" wheels are secured by means of a plate and pins.

The plate has a central opening which fits over the central post and a plurality of holes therein. These holes are so arranged that they will accommodate the different configurations of bolt holes in the wheels. The operator in using these plates initially mounts the plate on the central post, consults a chart which instructs him as to the appropriate selection of holes for the particular model wheel and aligns the designated holes with bolt holes in accordance with the chart indications. A collar then secures the plate to the central post and a series of pins are passed through the plate to engage the bolt holes in the wheel and restrain the wheel from movement. The collar prevents movement of the wheel rim along or up the post and the pins which extend through the plate to engage the bolt holes restrain the wheel from rotational movement around the post.

SUMMARY OF THE INVENTION

It is the principal object of the present invention to provide a means whereby any wheel having a central hub hole may be accommodated and secured on the shaft of a tire-changing machine or the like with facility, speed and economy.

To accomplish this objective, there is provided in accordance with the present invention wheel-restraining means for use in restraining a tire wheel rim on a generally vertical wheel-engaging shaft of a machine for working on a tire, said shaft being substantially immovable in a vertical direction comprising a rigid member having an opening therein engageable with said shaft, a flexible member extending below the underside of said rigid member, said flexible member comprising an inflatable, annular air bag having a lower surface engageable with an adjacent surface of a tire wheel, and adjustable locking means on said shaft engageable with said rigid member to urge said flexible member into pressure engagement with said wheel to substantially restrain movement of said wheel in at least a vertical direction.

These and other features and objects of the present invention will be more apparent from the following description and drawings in which several embodiments are illustrated by way of example, and in which:

FIG. 2 is an exploded perspective view of one embodiment of the present invention and serves to illustrate its relationship prior to mounting with a tire-changing machine;

FIG. 4 is a schematic vertical section of the apparatus shown in FIG. 3 with the tire structure omitted for the sake of clarity.

Figure 1:
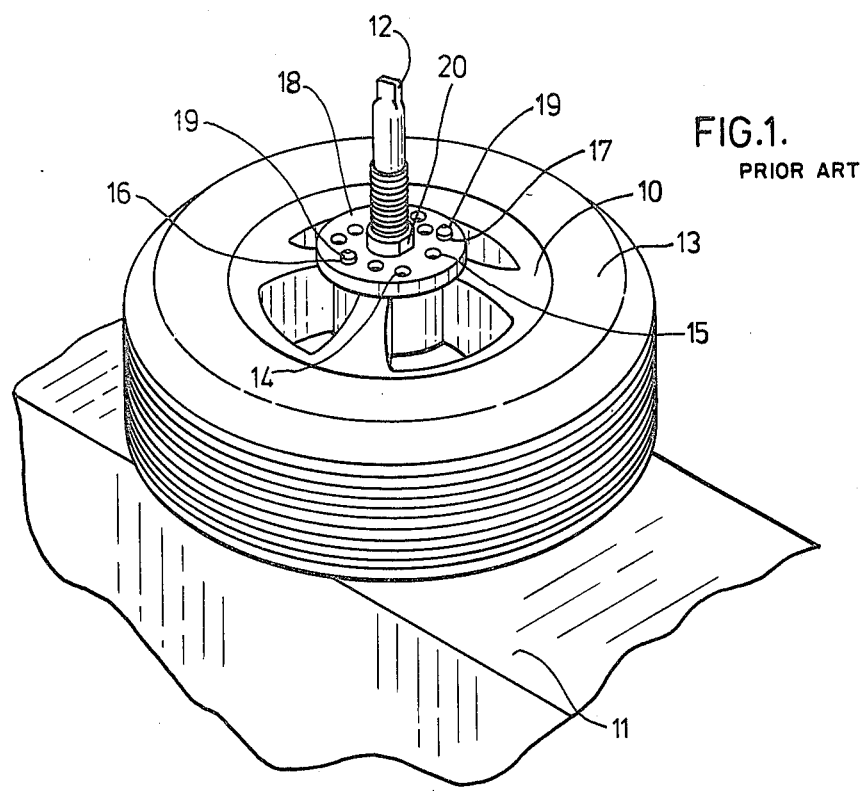
FIG. 1 is a perspective top view of a tire-changing machine with a wheel of the "exotic" type secured in position by means of the apparatus of the prior art.

Referring now to the drawings, in FIG. 1 the wheel rim is generally indicated at 10, the upper visible surface of a tire-changing machine at 11 and the central wheel mounting shaft of a tire-changing machine at 12. The tire is indicated at 13.

When the tire is to be repaired, the tire in combination with the wheel rim is mounted on the tire changing machine 11 so that shaft 12 passes therethrough. The operator, since the example shown is a non-conventional wheel structure, then selects a plate such as 18 which is provided with the various holes such as 14, 15, 16 and 17. This plate is rotated until the respective holes are aligned with the bolt holes on the wheel web and pins such as 19 are passed through the aligned holes 16 and 17 in the example shown and secured in position. A collar 20 is then passed over the shaft 12 and made fast through its threaded engagement with the shaft.

As will be seen with respect to FIG. 1 arrangement, the various arrangements of the holes and the number of operations required to effect securement makes this operation both awkward and time-consuming. In FIG. 2 the upper part of a tire-changing machine is generally indicated at 21 and has a table 22 upon which an arcuate inwardly and upwardly sloping surface 23 is provided. Through the upper surface of 23 a central shaft 12 and a pin 24 extend in the manner shown. Pin 24 is so mounted that it may move in a plane towards and away from the central shaft 12. This permits engagement with bolt holes on the wheel web at various distances from the centre of the wheel hub.

In this embodiment with the conventional wheel rim, the wheel 10 is dropped over or placed over the central shaft 12 and so arranged that the pin 24 engages one of the bolt holes 25. Over this assembly a wheel fastening mechanism 26 in accordance with the present invention is mounted and a collar 27 is passed over and threadedly engaged with shaft 12. As collar 27 is threaded down the outside wall it engages with the inner periphery of the wheel fastening mechanism 26 to be tightly secured in position.

The fastening means 26 comprises an upper rigid plate 30 below which is provided an inflatable rubber bag 31. The inflatable bag 31 is connected through an inflating valve 32 and a pressure relief valve 33 which extend through plate 30.

After the mounting sequence previously described has been followed the inflatable bag 31 is inflated from any given air source. The pressure relief valve 33 is so set that the pressure exerted by the inflatable bag 31 does not exceed 15 pounds pressure per square inch.

With this arrangement, the wheel is now set and firmly fixed in position so that operations may be carried out on the tire.

Figure 3:
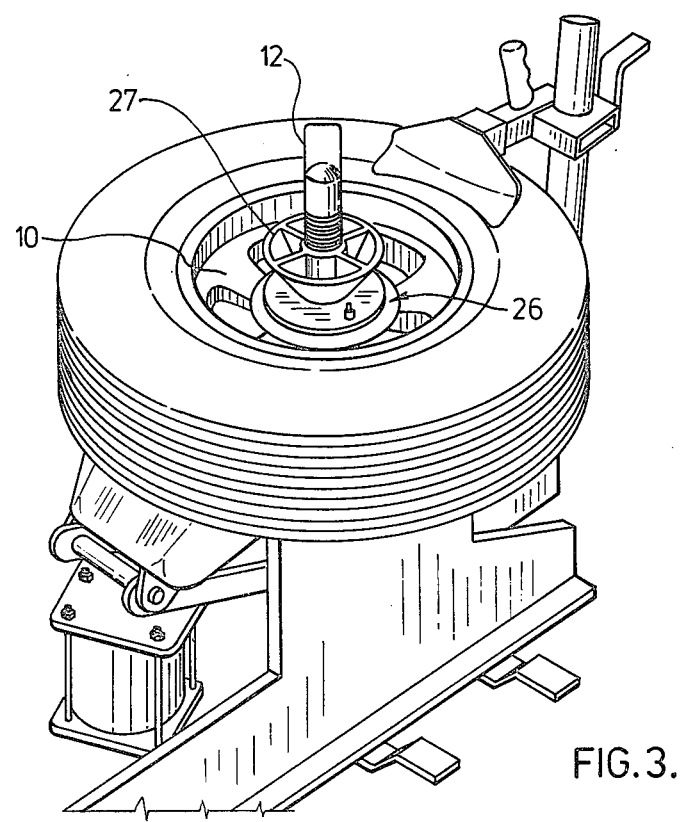
FIG. 3 is a perspective view of an alternate embodiment of an apparatus in accordance with the present invention when used in association with a tire-changing machine.

FIG. 3 is illustrated as a perspective view from the top of a further embodiment with the wheel fastening means secured in position. In this embodiment the wheel is one of the magnesium wheel structures.

With magnesium wheel structures the central hub hole is relatively weak. In the prior discussion of the FIG. 2 embodiment the cone 27 served to centre the wheel and the wheel fastening means 26. In this embodiment of FIG. 3 because of the relatively fragile nature of the magnesium wheel hub structure it is necessary that the wheel be centered and fastened by its separate mechanisms.

In the FIG. 3 embodiment, shown in FIG. 4, prior to mounting the wheel 10 on the central shaft 12 a spring loaded cone 40 is mounted so that spring 41 engages the base or surface 23 of the tire-changing machine. The engagement between the upper surface of the cone 42 and an adjacent edge of the magnesium wheel hub 43 centres the wheel on the shaft 12. The wheel fastening means 26 is then mounted in the manner previously described and secured in position by means of cone 27 and again bag 31 is inflated to a pressure of 15 pounds.

The cone 40 will accommodate up to 25 different sizes of central hub openings, the present range of hubs. It will, of course, be understood that this number may be varied by altering the slope 42.

From the foregoing, it will be seen that a new and simple means of fastening the wheels on shafts for the purposes of repair and adjustment has been provided and the operator can use these means with much greater facility and speed than previously.

It will, of course, be understood that various sizes of rings may be substituted for the lower conical 40 member and it will also be understood that this wheel fastening mechanism can be used with any form of machine for working on a tire for the purposes of repairing, adjusting or the like.

I claim:

1. Wheel restraining means for use in restraining a tire wheel rim on a generally vertical shaft of a machine for working on a tire, said shaft being substantially immovable in a vertical direction, comprising rigid member means having an opening therein embracing said shaft, a flexible member extending below the underside of said rigid member, said flexible member comprising an inflatable, annular air bag having a lower surface engagable with an adjacent surface of a tire wheel, and an adjustable locking means on said shaft engagable with said rigid member to urge said flexible member into vertical pressure engagement with said wheel to substantially restrain movement of said wheel at least in a vertical direction.

2. Wheel-restraining means as claimed in claim 1, wherein said inflatable air bag is rubber and includes air inlet means and a pressure relief valve adapted to be actuated at a predetermined pressure.

3. Wheel-restraining means as claimed in claim 2, wherein said air inlet means and said pressure relief valve extend through said rigid member.

4. Wheel-restraining means as claimed in claims 1, 2 or 3 further including in combination therewith a conical member on said shaft engagable with a central opening in said wheel and means for urging said conical member into engagement with said opening.

* * * * *